United States Patent
Nakano

(10) Patent No.: US 10,250,075 B2
(45) Date of Patent: Apr. 2, 2019

(54) POWER RECEIVING APPARATUS CAPABLE OF CONTACTLESS FEEDING AND CONTACT FEEDING, METHOD OF CONTROLLING POWER RECEIVING APPARATUS, AND RECORDING MEDIUM

(71) Applicant: CANON KABUSHIKI KAISHA, Tokyo (JP)

(72) Inventor: Katsuya Nakano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 188 days.

(21) Appl. No.: 15/261,664

(22) Filed: Sep. 9, 2016

(65) Prior Publication Data

US 2017/0077757 A1     Mar. 16, 2017

(30) Foreign Application Priority Data

Sep. 15, 2015   (JP) .................................. 2015-181418

(51) Int. Cl.
*H02J 7/02*      (2016.01)
*H02J 50/12*     (2016.01)
*H02J 50/80*     (2016.01)

(52) U.S. Cl.
CPC ............. *H02J 50/12* (2016.02); *H02J 7/025* (2013.01); *H02J 50/80* (2016.02)

(58) Field of Classification Search
CPC .. H02J 50/12; H02J 50/80; H02J 7/025; H02J 17/00; H04B 5/0025–5/0093; H01F 38/14; H01F 2038/143

USPC .......................................... 307/104; 320/108
See application file for complete search history.

(56) References Cited

U.S. PATENT DOCUMENTS

| 2014/0113689 | A1* | 4/2014 | Lee | .................. | H04W 52/0277 |
| | | | | | 455/573 |
| 2014/0285141 | A1* | 9/2014 | Lee | ......................... | H02J 50/80 |
| | | | | | 320/108 |
| 2014/0327409 | A1* | 11/2014 | Lee | ......................... | H02J 7/025 |
| | | | | | 320/137 |

FOREIGN PATENT DOCUMENTS

JP           H11-98706 A        4/1999

* cited by examiner

*Primary Examiner* — Hal Kaplan
(74) *Attorney, Agent, or Firm* — Canon U.S.A., Inc. IP Division

(57) ABSTRACT

Provided is a power receiving apparatus including: a contact power receiving unit configured to receive power with use of a wired transfer path via a connecting terminal; a contactless power receiving unit configured to receive power with use of a wireless transfer path via contactless coupling with a power supply apparatus; and a control unit configured to determine whether or not power is receivable by the contact power receiving unit and the contactless power receiving unit to control charging of power supply. According to the above embodiment, in a case where power is receivable by both the contactless power receiving unit and the contact power receiving unit, the control unit controls a rechargeable battery to be allowed to be charged with power received by the contact power receiving unit, and communication with the power supply apparatus to be allowed via the contactless coupling with the power supply apparatus.

15 Claims, 7 Drawing Sheets

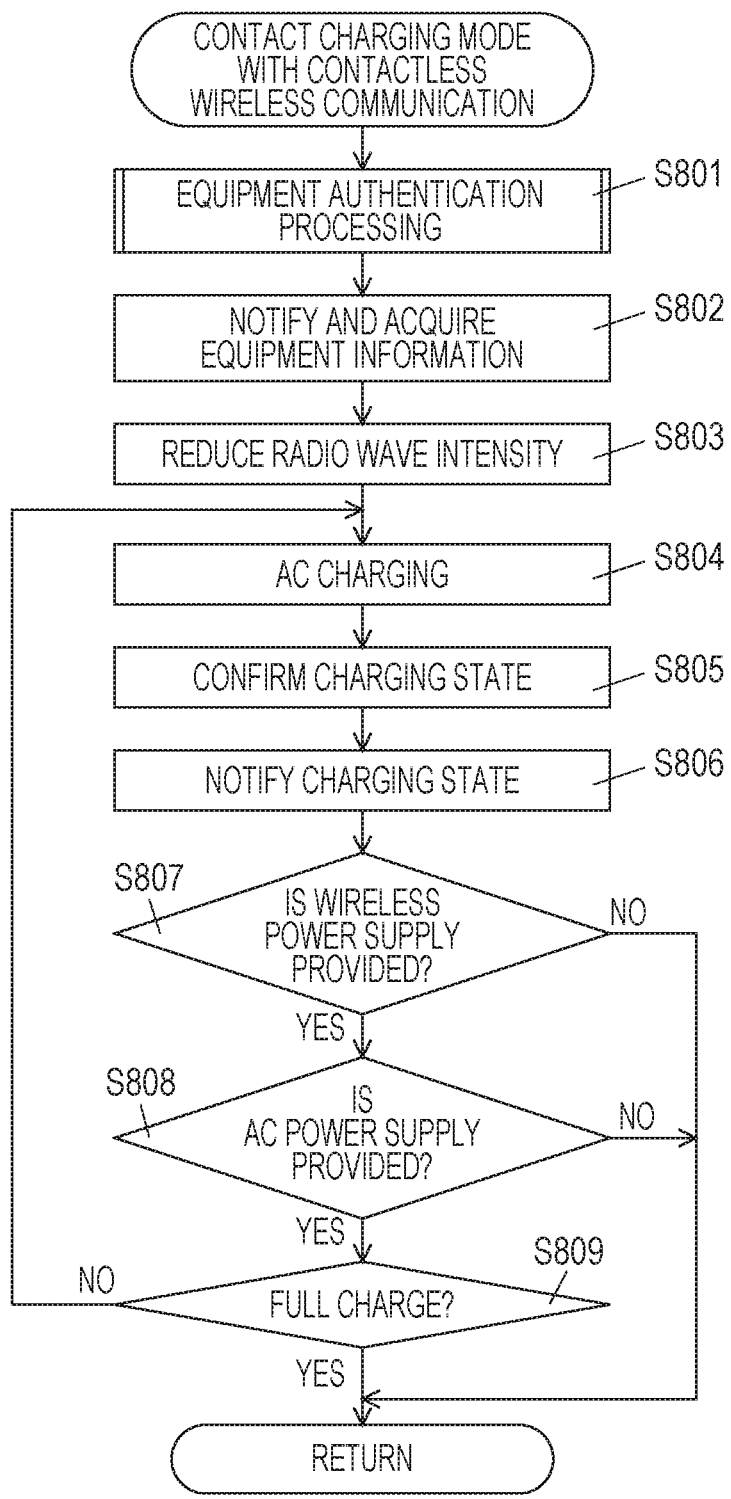

POWER RECEIVING APPARATUS CAPABLE OF CONTACTLESS FEEDING AND CONTACT FEEDING, METHOD OF CONTROLLING POWER RECEIVING APPARATUS, AND RECORDING MEDIUM

BACKGROUND

Field

Aspects of the present invention relate to a power receiving apparatus of a feeding system capable of selecting contactless feeding and contact feeding.

Description of the Related Art

A contactless feeding system has been put into practical use for transporting power to electric and electronic equipment in a contactless manner. For example, Japanese Patent Laid-Open No. 11-98706 discloses a scheme for arranging a primary coil on the side of a power supply apparatus and a secondary coil on the side of a power receiving apparatus in order to transport power from a feeding side to a power receiving side by means of electromagnetic coupling.

For example, the power supply apparatus provides conversion of commercial power-supply voltage into high-frequency alternating voltage through a high-frequency inverter circuit to apply a high-frequency current of 60 to 600 kHz to the primary coil. The power receiving apparatus provides conversion of alternating voltage induced in the secondary coil into a direct current in a secondary rectification smoothing circuit so as to charge a secondary battery.

Such a contactless feeding function is equipped in electric and electronic equipment together with a contact feeding function via a conventional cable connection, so that a user may select which feeding function to utilize for charging power supply of the equipment depending on the situation.

It is also known that a primary coil and a secondary coil for contactless feeding are used for data transport from a power receiving apparatus to a power supply apparatus. For example, the power supply apparatus is capable of acquiring ID information and a charging state of power receiving apparatus/receiving equipment.

However, a contactless feeding system available also for data transport based on contactless feeding would, in the case of allowing selection of contact feeding by means of wired connection, conventionally disable a contactless feeding portion so as not to allow utilization of data transport based on contactless feeding in a contact feeding state. As a result, for example, the power supply apparatus may not recognize a situation of the power receiving apparatus such as a level of charge, for example.

SUMMARY

One aspect of the invention is a power receiving apparatus including: a contact power receiving unit configured to receive power with use of a wired transfer path via a connecting terminal; a contactless power receiving unit configured to receive power with use of a wireless transfer path via contactless coupling with a power supply apparatus; and a control unit configured to determine whether or not power is receivable by the contact power receiving unit and the contactless power receiving unit to control charging of power supply by the contact power receiving unit and the contactless power receiving unit, in which in case where power is receivable by both the contactless power receiving unit and the contact power receiving unit, the control unit controls a rechargeable battery to be allowed to be charged with power received by the contact power receiving unit, and communication with the power supply apparatus to be allowed via the contactless coupling with the power supply apparatus.

Further features of the present invention will become apparent from the following description of exemplary embodiments with reference to the attached drawings.

BRIEF DESCRIPTION OF THE DRAWINGS

FIG. 8 is an operational flowchart of a contact charging mode with contactless wireless communication according to one embodiment.

DESCRIPTION OF THE EMBODIMENTS

Hereinafter, description will be given in detail for embodiments of the invention with reference to the drawings.

Embodiment 1

Figure 1:
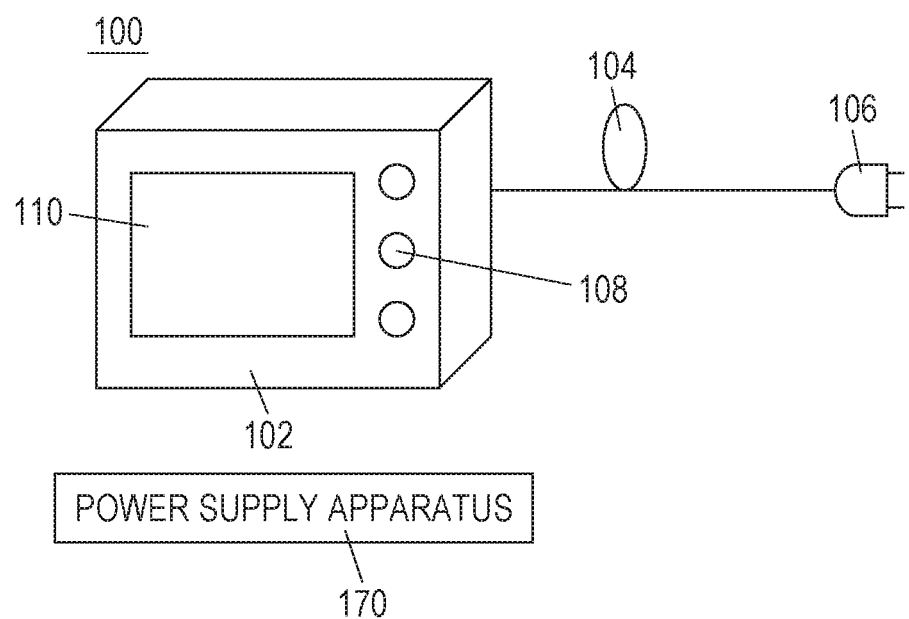
FIG. 1 is an appearance diagram of one embodiment according to the invention.

FIG. 1 illustrates an appearance diagram of one embodiment of a power receiving apparatus according to the invention.

A power receiving apparatus 100 is a portable working with a chargeable battery, such as a notebook-type mobile personal computer, a personal digital assistant, or the like. The power receiving apparatus 100 of the present embodiment may receive power from two paths: a contactless wireless power transfer path and a wired power transfer path. Specifically, the power receiving apparatus 100 is provided with a contactless coupling portion 102 on its bottom for electric power supply and data transport by means of contactless connection with a power supply apparatus 170 so as to allow contactless feeding from the power supply apparatus 170. The power receiving apparatus 100 has also a power cable 104 and a power plug 106 connected thereto inserted into an outlet, thereby allowing feeding from AC power supply. The power cable 104 and the power plug 106 constitute a part of a contact power receiving unit configured to receive power by means of contact transport.

The power receiving apparatus 100 is also provided with an operation portion 108 for accepting input from a user, and a display portion 110 for displaying different pieces of information.

Figure 2:
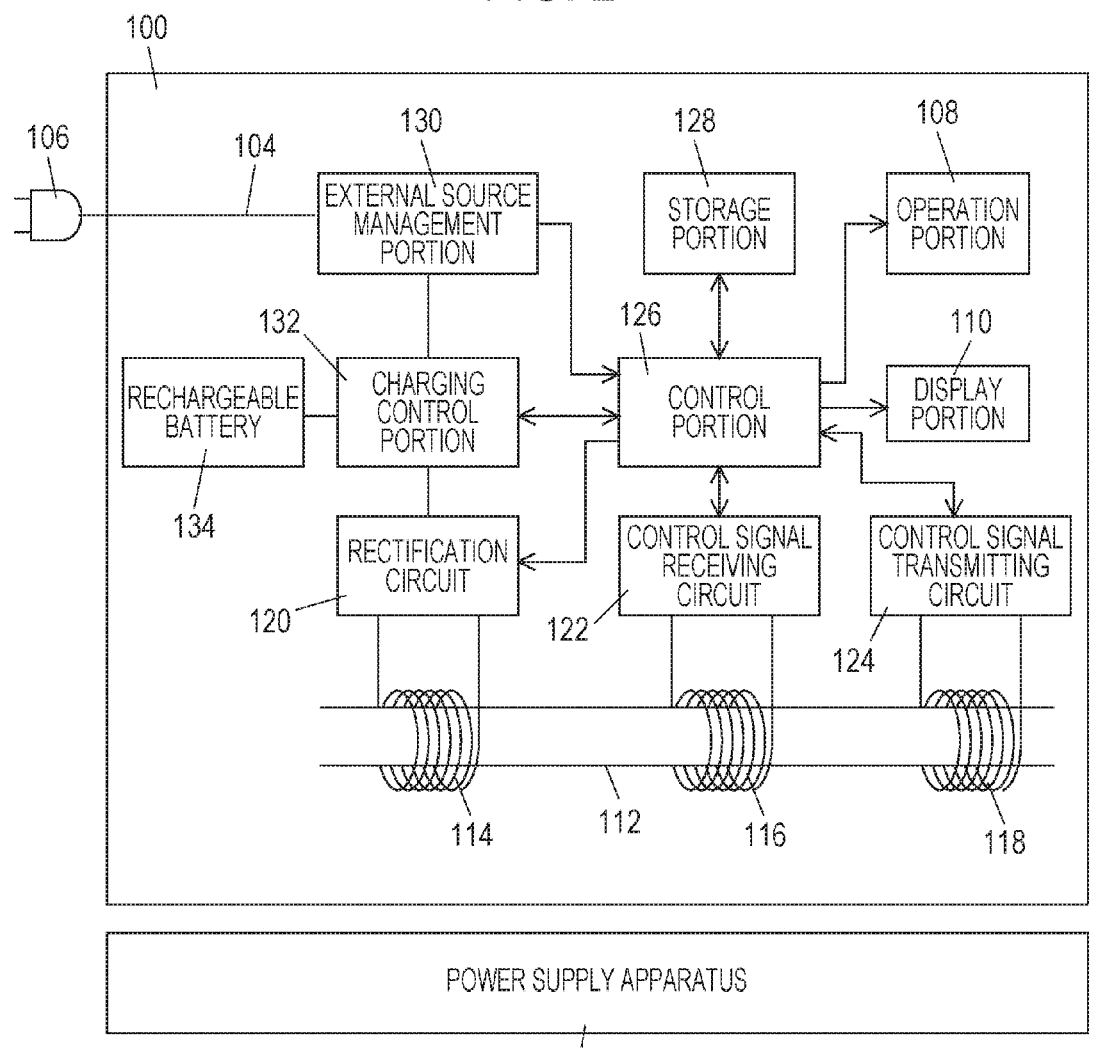
FIG. 2 is a schematic configuration block diagram according to one embodiment.

FIG. 2 is a schematic configuration block diagram of the power receiving apparatus 100. A power receiving coil 114, a receiving coil 116, and a transmitting coil 118 are wound around a core 112 of the power receiving apparatus 100. A rectification circuit 120 is a contactless power receiving unit configured to receive alternating-current power supplied from the power supply apparatus 170 via the power receiving coil 114, and is provided for rectifying alternating-current power from the power receiving coil 114.

A control signal receiving circuit 122 receives a control signal transmitted from the power supply apparatus 170 via the receiving coil 116. A control signal transmitting circuit 124 transmits a control signal to the power supply apparatus 170 via the transmitting coil 118. Control signals are transmitted and received using a frequency different from that in feeding via the power receiving coil 114.

A control portion 126 controls the whole power receiving apparatus 100 including the rectification circuit 120, the control signal receiving circuit 122, and the control signal transmitting circuit 124 by following a control program stored in a storage portion 128. The control portion 126 utilizes the storage portion 128 as a non-transitory storage unit configured to temporarily store data.

An external source management portion 130 constitutes a contact power receiving unit or a part thereof, and rectifies commercial alternating-current power from the power plug 106 to supply direct-current power to a charging control portion 132. Additionally, the external source management portion 130 is provided with a connecting terminal capable of attaching/detaching a cable 104. The charging control portion 132 charges a rechargeable battery 134 with direct-current power from the rectification circuit 120 or the external source management portion 130.

Figure 3:
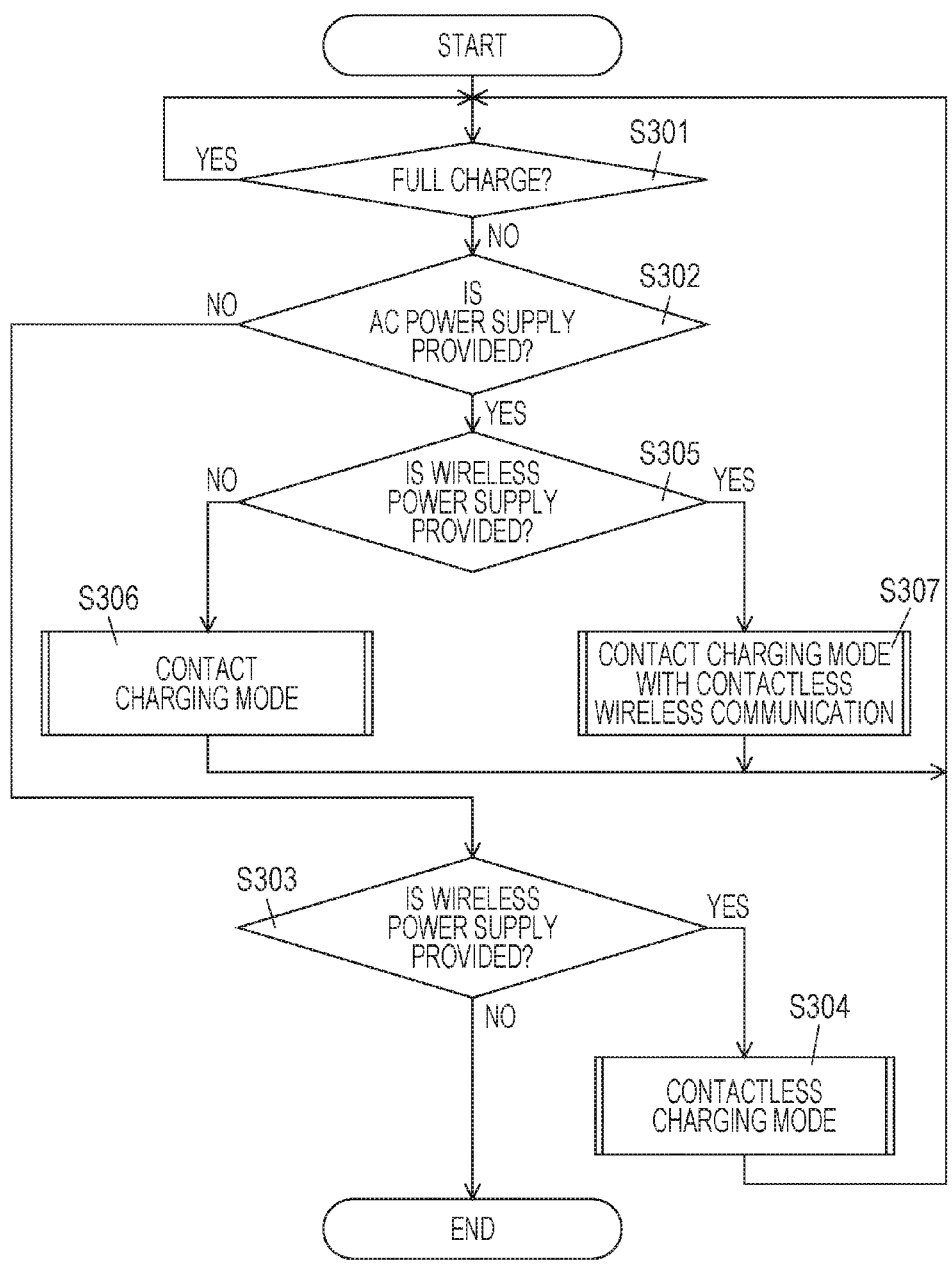
FIG. 3 is a flowchart of main processing according to one embodiment.

FIG. 3 is an operational flowchart of main processing of the power receiving apparatus 100. When alternating-current power is input from the power plug 106, the external source management portion 130 supplies to the charging control portion 132 direct-current power obtained by rectifying such alternating-current power, while notifying the control portion 126 of a state where contact feeding is available. Moreover, the rectification circuit 120 notifies the control portion 126, when detecting from the power receiving coil 114 an electromagnetic coupling state with the power supply apparatus 170, of a state where contactless feeding is available.

The control portion 126 causes, when detecting a state where feeding is available on notice from the external source management portion 130 or the rectification circuit 120, the charging control portion 132 to confirm a charging state of the rechargeable battery 134 (S301). In a case where output voltage of the rechargeable battery 134 is higher than a predetermined value (S301), the charging control portion 132 determines that the rechargeable battery is in a full charge state, and confirms the charging state repeatedly (for example, periodically) (S301).

In a case where the output voltage of the rechargeable battery 134 is the predetermined value or less (NO at S301), the charging control portion 132 determines that the rechargeable battery 134 is in a state of requiring charge to notify the control portion 126, and the control portion 126 confirms availability of AC power supply in response to such a notice (S302). At S302, the control portion 126 determines that the AC power supply is available in a case where a notice has been given of a state where contact feeding is available from the external source management portion 130.

In a case where the AC power supply is not available (S302), the control portion 126 confirms availability of contactless feeding from the power supply apparatus 170 (S303). At S303, the control portion 126 determines that contactless feeding is available in a case where a notice has been given of a state where contactless feeding is available from the rectification circuit 120. In a case where contactless feeding from the power supply apparatus 170 is not available (S303), the control portion 126 finishes the flow indicated in FIG. 3.

In a case where contactless feeding is available (S303), the control portion 126 sets a contactless charging mode (feeding from the power supply apparatus 170) to the charging control portion 132 (S304). The details of the contactless charging mode (S304) will be described below.

Even in a case where the AC power supply is available (S302), the control portion 126 confirms availability of contactless feeding (S305).

In a case where contactless feeding is not available (S305), the control portion 126 sets a contact charging mode (feeding from the AC power supply) to the charging control portion 132 (S306). The details of the contact charging mode (S306) will be described below.

In a case where contactless feeding is also available (S305), the control portion 126 sets a contact charging mode with contactless wireless communication (mode of allowing contactless communication with the power supply apparatus 170 in parallel with contact charge) to the charging control portion 132 (S307). The details of the contact charging mode with contactless wireless communication (S307) will be described below.

The charging control portion 132 notifies the control portion 126 periodically that the rechargeable battery 134 is being charged, and a charging mode being employed, when the rechargeable battery 134 is charged.

The control portion 126 and the charging control portion 132 may execute the processing indicated in FIG. 3 using power from the external source management portion 130 or the rectification circuit 120, or using power from the rechargeable battery 134. In the latter case, the control portion 126 finishes the flow indicated in FIG. 3 once available power of the rechargeable battery 134 is used up.

Figure 4:
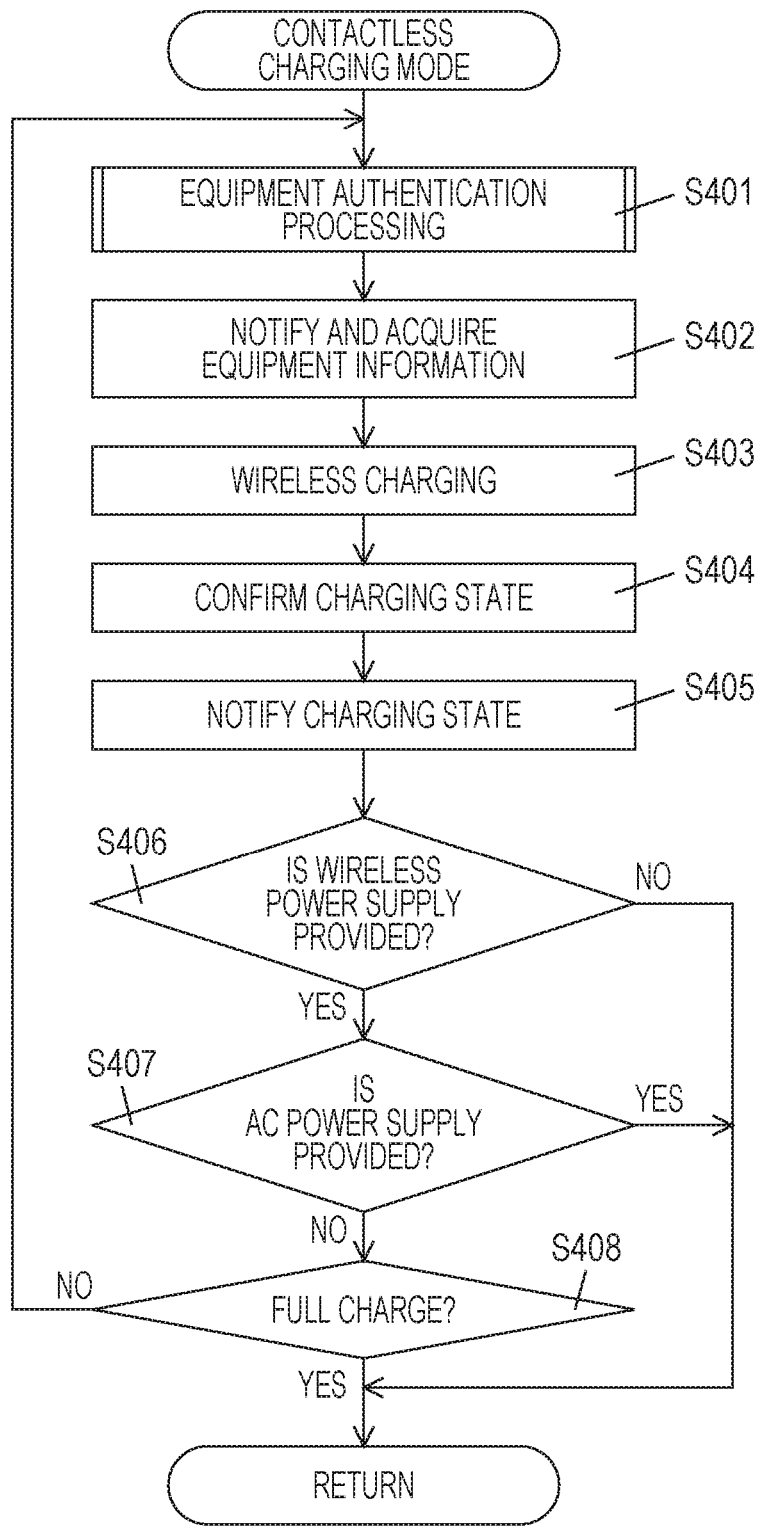
FIG. 4 is an operational flowchart of a contactless charging mode according to one embodiment.

FIG. 4 illustrates an operational flowchart of the contactless charging mode. The control portion 126 performs authentication processing with the power supply apparatus 170 (S401).

Figure 5:
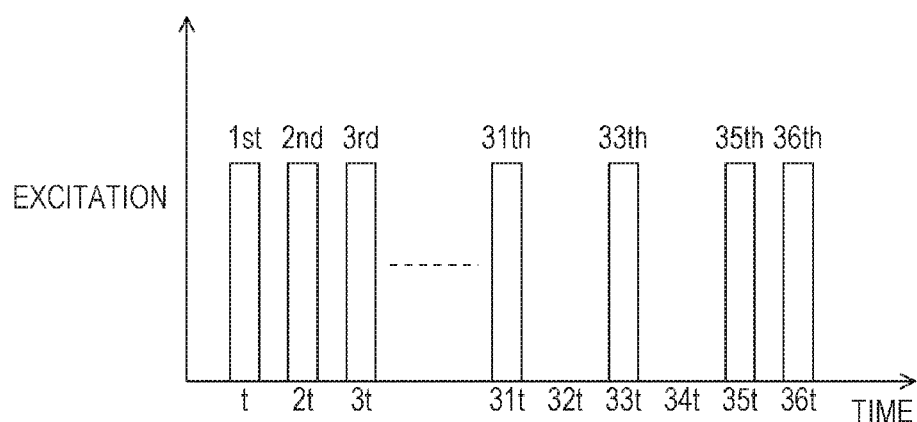
FIG. 5 illustrates a timing example of communication between a power supply apparatus and a power receiving apparatus according to one embodiment.

Details of the authentication processing will be described. The rectification circuit 120 detects magnetic flux from the power supply apparatus 170 by output from the power receiving coil 114, a notice of which is given to the control portion 126. The control portion 126 causes the control signal transmitting circuit 124 to generate a predetermined query signal. The query signal is transmitted from the transmitting coil 118 to the power supply apparatus 170 with magnetic flux much lower than magnetic flux used in contactless feeding from the power supply apparatus 170, and at a different frequency from that for feeding. FIG. 5 illustrates an exemplary waveform of a query signal. Whether to be excited or not excited is indicated with binary values of "0" and "1" correspondingly. An amount of signals itself is very small, and a low frequency may thus be provided. The power supply apparatus 170 transmits response signal or a control signal to the power receiving apparatus 100, for example, based on contactless coupling, in response to such a query from the power receiving apparatus 100.

Figure 6:
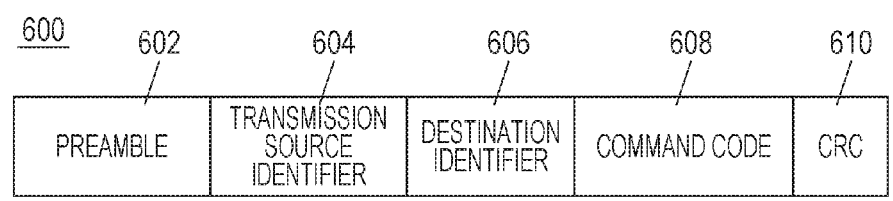
FIG. 6 illustrates a packet structure example of communication between a power supply apparatus and a power receiving apparatus according to one embodiment.

FIG. 6 illustrates an exemplary common packet structure of a query signal and a response signal transmitted and received between the power receiving apparatus 100 and the power supply apparatus 170. A packet 600 illustrated in FIG. 6 is comprised of a preamble 602, a transmission source identifier 604, a destination identifier 606, a command code 608, and a CRC (cyclic redundancy code) 610 for error detection and correction. The preamble 602 is provided for synchronizing a power supply apparatus (transmitting side) and a power receiving apparatus (receiving side). The transmission source identifier 604 is an identifier indicating the power supply apparatus 170 as a transmission source, and includes, for example, physical address information for allowing the power supply apparatus 170 to be identified uniquely. The destination identifier 606 is an identifier indicating one or more power receiving apparatuses. The command code 608 is a part indicating a predefined control code, where a control signal or a response signal to the power receiving apparatus 100 is accommodated. The CRC 610 is provided for checking whether a bit sequence of a packet is correct. Further, the transmission source identifier 604 is identifier information containing therein physical address information for allowing unique identification of a transmission device.

The power receiving apparatus 100 sets the destination identifier 606 as anonymous to transmit a query signal toward a power supply apparatus (power supply apparatus 170 here) possibly being present near. A query command code is set to the command code 608 for querying about a power supply apparatus, and the transmission source identifier 604 contains identification information indicating the power receiving apparatus 100 itself.

The power supply apparatus (power supply apparatus 170 here) that has received the query signal contains a response command to a query command in the command code 608 for replying to the power receiving apparatus 100. The transmission source identifier 604 of such a reply packet has an identifier indicating the power supply apparatus itself stored therein, and the destination identifier 606 has an identifier indicating the power receiving apparatus 100 stored therein.

The control portion 126 of the power receiving apparatus 100 receives a response signal from the power supply apparatus via the receiving coil 116 and the control signal receiving circuit 122, and extracts the response command from the command code 608 of the received response signal. The control portion 126 matches the response command to the query command of the previous query signal in such a way as to discriminate whether or not a response to the previous query is provided. Additionally, an identifier included in the transmission source identifier 604 of a response packet allows the power supply apparatus 170 to be identified and specified.

After authentication (S401), the control portion 126 transmits to the power supply apparatus 170 a charging state of the power receiving apparatus 100, equipment information, user information and the like, via the control signal transmitting circuit 124 and the transmitting coil 118 (S402). The control portion 126 also acquires equipment information from the power supply apparatus 170 via the receiving coil 116 and the control signal receiving circuit 122 (S402).

After exchanging equipment information and the like (S402), the power supply apparatus 170 stops contactless coupling-based data communication, and executes contactless feeding to the power receiving apparatus 100 (S403).

The control portion 126 queries and confirms with the charging control portion 132 regarding a charging state of the rechargeable battery 134 at a predetermined time interval (S404) to notify the power supply apparatus 170 of the charging state via the control signal transmitting circuit 124 and the transmitting coil 118 (S405).

The control portion 126 confirms a charging situation of the rechargeable battery 134, thereafter confirming whether or not contactless feeding continues (S406). In a case where contactless feeding is stopped (S406), the control portion 126 finishes the contactless charging mode. In a case where contactless feeding continues (S406), the control portion 126 confirms whether or not contact feeding is available (S407). In a case where contact feeding is available (S407), the control portion 126 finishes the contactless charging mode in order to change the charging mode. In this case, for example, during executing contactless feeding, the power cable 104 and the power plug 106 connected thereto may be inserted into an outlet, where charging efficiency is higher in contact feeding, thus giving priority to contact charging. Therefore, a state where both contactless feeding and contact feeding become available is provided, thereby shifting to a contact charging mode with contactless wireless communication.

In a case where contact feeding is not available (S407), the control portion 126 confirms a current charging state of the rechargeable battery 134 (S408). In a case where an amount of charge of the rechargeable battery 134 is greater than a predetermined value (S408), the control portion 126 assumes that the rechargeable battery 134 is in a fully charged state, and finishes the contactless charging mode. In a case where the amount of charge of the rechargeable battery 134 is the predetermined value or less (S408), the control portion 126 returns to S401 to execute the processing of the contactless charging mode again.

Figure 7:
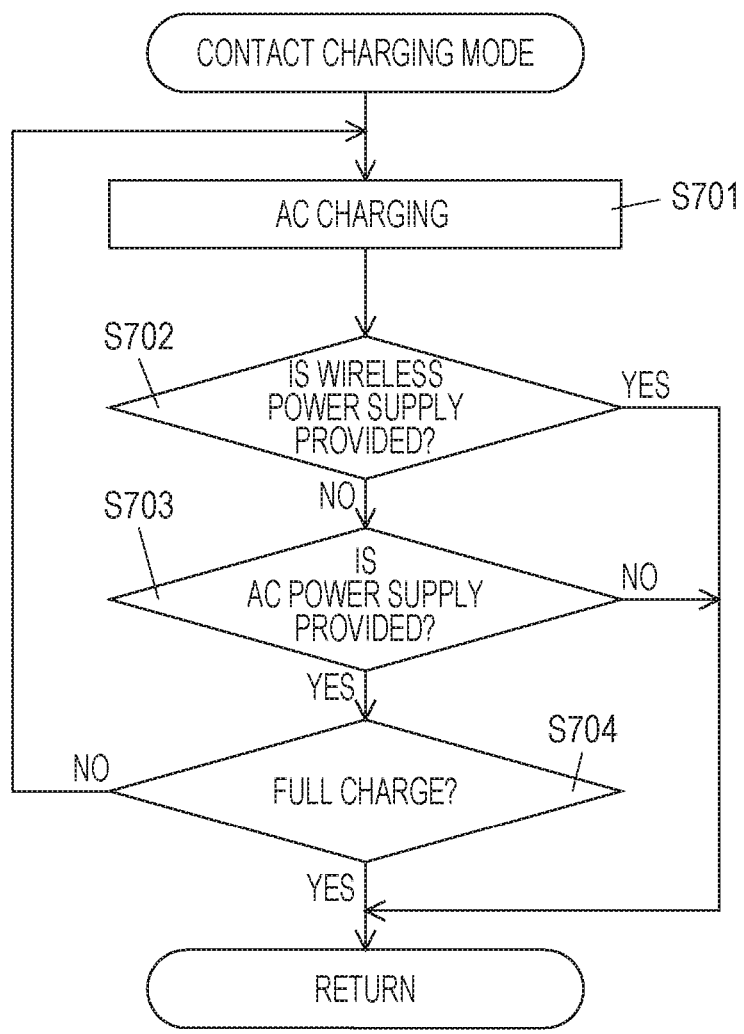
FIG. 7 is an operational flowchart of a contact charging mode according to one embodiment.

FIG. 7 illustrates operational flowchart of the contact charging mode (S306).

The external source management portion 130 supplies to the charging control portion 132 direct-current power obtained by rectifying alternating-current power from the power plug 106, and the charging control portion 132 charges the rechargeable battery 134 with the direct-current power from the external source management portion 130 (S701).

The control portion 126 confirms availability of contactless feeding according to a notice from the rectification circuit 120 or a query to the charging control portion 132 (S702). In a case where contactless feeding is available (S702), the control portion 126 finishes the contact charging mode indicated in FIG. 7 in order to change the charging mode. In this case, for example, the power cable 104 and the power plug 106 connected thereto may be inserted into an outlet to bring the power receiving apparatus 100 close to the power supply apparatus 170 while executing contact charging, thereby causing a state where contactless feeding is available. In this case, both contactless feeding and contact feeding become available so as to shift to the contact charging mode with contactless wireless communication.

In a case where contactless feeding is not available (S702), the control portion 126 queries the charging control portion 132 to confirm whether contact feeding continues (S703). In a case where contact feeding is stopped (S703), the control portion 126 finishes the contact charging mode indicated in FIG. 7 in order to change the charging mode.

In a case where contact feeding continues (S703), the control portion 126 confirms with the charging control portion 132 a current charging state of the rechargeable battery 134 (S704). In a case where the amount of charge of the rechargeable battery 134 is greater than the predetermined value (S704), the control portion 126 assumes that the rechargeable battery 134 is in a fully charged state, and finishes the contact charging mode indicated in FIG. 7. In a case where the amount of charge of the rechargeable battery 134 is the predetermined value or less (S704), the control portion 126 returns to S701 to execute the processing of the contact charging mode again.

FIG. 8 illustrates an operational flowchart of the contact charging mode with contactless wireless communication (S307).

The control portion 126 executes authentication processing with a power supply apparatus (power supply apparatus 170 here) (S801) that is processing similar to the authentication processing at S401, and exchanges equipment information with the power supply apparatus by a method similar to that at S402 (S802). In exchanging of the equipment information, the control portion 126 notifies the power supply apparatus 170 that feeding other than contactless feeding (AC feeding via the power plug 106 here) is also available.

The control portion 126 requests the power supply apparatus 170 to reduce generating magnetic force intensity, through the control signal transmitting circuit 124 and the transmitting coil 118, in order to use magnetic coupling with the power supply apparatus 170 for signal transportation (S803). The power supply apparatus 170 lowers, once receiving this request, the intensity of magnetic flux for feeding, while securing an intermittent or periodic time slot for signal transportation. The power supply apparatus 170 transmits a notice to the power receiving apparatus 100 that the power supply apparatus 170 itself is present and contactless feeding is available, in the intermittent or periodic time slot.

The control portion 126 instructs the charging control portion 132 to charge the rechargeable battery 134 with power from the external source management portion 130 (S804), and queries the charging control portion 132 to confirm a current charging situation (S805). The control portion 126 notifies the power supply apparatus 170 through the control signal transmitting circuit 124 and the transmitting coil 118, of the acquired current charging situation (S806). This makes it possible for the power supply apparatus 170 to recognize a charging state of the power receiving apparatus 100. For example, even when the power plug 106 is disconnected from an outlet so as to cause a situation of impossible contact charging, it is not necessary to recognize a charging state for determining the necessity for wireless feeding again, thereby making it possible to shift to the next processing smoothly.

The control portion 126 confirms availability of contactless feeding according to whether or not a periodic notice is received from the power supply apparatus 170 (S807). In a case where it is impossible to receive a signal from the power supply apparatus 170 for a predetermined period or more (S807), the control portion 126 finishes the contact charging mode with contactless wireless communication indicated in FIG. 8 in order to change the charging mode. In a case where the notice from the power supply apparatus 170 may be received within the predetermined period (S807), the control portion 126 determines that contactless feeding is available and confirms whether or not contact feeding is available (S808).

In a case where contact feeding (AC power supply) is not available (S808), the control portion 126 finishes the contact charging mode with contactless wireless communication indicated in FIG. 8 in order to change the charging mode. In this case, the power plug 106 may have been disconnected from an outlet. At the time, the charging mode is to shift to the contactless charging mode, while data may have been communicated by means of contactless wireless communication. In this case, switching of the mode may be suspended until data communication is completed. Alternatively, data communication may be completed before shifting processing to S403.

Additionally, a situation may be desired where charging is given priority over data communication depending on a charging state. Therefore, a charging state recognized at S806 is confirmed, so that data communication is prioritized and switching of the mode is thus suspended in a state where charging of a certain level or more has been performed, while charging is prioritized to stop communication for moving to the processing after S403 in a state where charging has been performed only less than the certain level. This makes it possible to achieve appropriate control of charging processing depending on the situation.

On the other hand, in a case where contact feeding (AC power supply) is available (S808), the control portion 126 confirms a current charging state with the charging control portion 132 (S809). In a case where the amount of charge of the rechargeable battery 134 is greater than the predetermined value (S809), the control portion 126 assumes that the rechargeable battery 134 is in a fully charged state, and finishes the contact charging mode with contactless wireless communication indicated in FIG. 8. In a case where the amount of charge of the rechargeable battery 134 is the predetermined value or less (S809), the control portion 126 returns to S804 to execute the processing after S804 again.

As mentioned above, a contactless feeding unit is used for data communication while a contact feeding unit is used for charging a rechargeable battery, so that data is communicated with a power supply apparatus while making it possible to achieve highly efficient charge.

In the present embodiment, in the case of charging only by a contactless feeding unit and charging only by a contact feeding unit, and in a case where it is possible to acquire power fed from both the contactless feeding unit and the contact feeding unit, it is possible to perform charging optimally.

In the case of charging only by the contactless feeding unit, it is possible to acquire power for charging from the contactless feeding unit, and exchange information such as a charging state.

In a case where both contactless feeding and contact feeding are available, power is acquired by means of power-efficient contact feeding while a contactless power supply apparatus is utilized only for data communication. This allows highly efficient charge and data communication with lower power consumption.

In a case where both contactless feeding and contact feeding are available, when the power receiving apparatus 100 is working with more than predetermined consumed power, power of contact feeding can cover power for working while the rechargeable battery 134 is charged with power of contactless feeding. Further, in a case where both contactless feeding and contact feeding are available, when it becomes impossible to utilize contact feeding, the control portion 126 can request the power supply apparatus 170 to increase power to be supplied within supply capacity.

Feeding by means of electromagnetic coupling is offered by, for example, utilizing magnetic resonance other than electromagnetic induction, and may be offered by any of them. Also, electric-field coupling may be utilized in this case.

While aspects of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application. No. 2015-181418, filed on Sep. 15, 2015, which is hereby incorporated by reference herein in its entirety.

What is claimed is:

1. A power receiving apparatus comprising:
one or more processors; and
one or more memories storing instructions which, when executed by the one or more processors, cause the power receiving apparatus to perform operations comprising:
receiving power by a contact power receiving operation with use of a wired transfer path via a connecting terminal;
receiving power by a contactless power receiving operation with use of a wireless transfer path via contactless coupling with a power supply apparatus; and
determining whether or not power is receivable by the contact power receiving operation and the contactless power receiving operation to control charging of a rechargeable battery by the contact power receiving operation and the contactless power receiving operation, wherein
in a case where power is receivable by both the contactless power receiving operation and the contact power receiving operation, performing control such that the rechargeable battery is allowed to be charged with power received by the contact power receiving operation, and communication with the power supply apparatus is allowed via the contactless coupling with the power supply apparatus.

2. The power receiving apparatus according to claim 1, wherein
in a case where power is receivable by both the contactless power receiving operation and the contact power receiving operation, the power supply apparatus is notified via the contactless coupling with the power supply apparatus, that the contactless coupling with the power supply apparatus is used for communication and that power from the power supply apparatus is not used for charging of the rechargeable battery.

3. The power receiving apparatus according to claim 1, wherein
in a case where power is receivable by both the contactless power receiving operation and the contact power receiving operation, the power receiving apparatus sends a request to the power supply apparatus to reduce power supplied from the power supply apparatus.

4. The power receiving apparatus according to claim 1, wherein
in the case of bringing a state where power is receivable by both the contactless power receiving operation and the contact power receiving operation into a state where power is not receivable by the contact power receiving operation, a notice is given to the power supply apparatus that the rechargeable battery is charged with power from the power supply apparatus.

5. The power receiving apparatus according to claim 1, wherein
in the case of bringing a state where power is receivable by both the contactless power receiving operation and the contact power receiving operation into a state where power is not receivable by the contact power receiving operation, a request is made to the power supply apparatus that power supplied from the power supply apparatus is increased.

6. A method of controlling a power receiving apparatus configured to perform a contact power receiving operation with use of a wired transfer path via a connecting terminal and a contactless power receiving operation with use of a wireless transfer path via contactless coupling with a power supply apparatus, comprising:
a step of determining whether or not power is receivable by the contact power receiving operation and the contactless power receiving operation;
a control step of controlling charging of a rechargeable battery with the contact power receiving operation and the contactless power receiving operation; and
a step of controlling, in a case where power is receivable by both the contactless power receiving operation and the contact power receiving operation, the rechargeable battery to be allowed to be charged with power received by the contact power receiving operation, and communication with the power supply apparatus to be allowed via the contactless coupling with the power supply apparatus.

7. The method of controlling the power receiving apparatus according to claim 6, wherein
in a case where power is receivable by both the contactless power receiving operation and the contact power receiving operation, the power supply apparatus is notified via the contactless coupling with the power supply apparatus, that the contactless coupling with the power supply apparatus is used for communication and that power from the power supply apparatus is not used for charging of the rechargeable battery.

8. The method of controlling the power receiving apparatus according to claim 6, wherein
in a case where power is receivable by both the contactless power receiving operation and the contact power receiving operation, the power supply apparatus is requested to reduce power supplied from the power supply apparatus.

9. The method of controlling the power receiving apparatus according to claim 6, wherein
in the case of bringing a state where power is receivable by both the contactless power receiving operation and the contact power receiving operation into a state where power is not receivable by the contact power receiving operation, a notice is given to the power supply apparatus that the rechargeable battery is charged with power from the power supply apparatus.

10. The method of controlling the power receiving apparatus according to claim 6, wherein
in the case of bringing a state where power is receivable by both the contactless power receiving operation and the contact power receiving operation into a state where power is not receivable by the contact power receiving operation, a request is made to the power supply apparatus that power supplied from the power supply apparatus is increased.

11. A non-transitory recording medium for recording a computer program which when executed performs a method of controlling a power receiving apparatus, the power receiving apparatus configured to perform a contact power receiving operation with use of a wired transfer path via a connecting terminal and a contactless power receiving operation with use of a wireless transfer path via contactless coupling with a power supply apparatus, the method of controlling comprising:
a step of determining whether or not power is receivable by the contact power receiving operation and the contactless power receiving operation;
a control step of controlling charging of a rechargeable battery by the contact power receiving operation and the contactless power receiving operation; and
a step of controlling, in a case where power is receivable by both the contactless power receiving operation and the contact power receiving operation, the rechargeable battery to be allowed to be charged with power received by the contact power receiving operation, and communication with the power supply apparatus to be allowed via the contactless coupling with the power supply apparatus.

12. The non-transitory recording medium according to claim 11, wherein the method of controlling further comprises:
in a case where power is receivable by both the contactless power receiving operation and the contact power receiving operation, notifying the power supply apparatus via the contactless coupling with the power supply apparatus, that the contactless coupling with the power supply apparatus is used for communication and that power from the power supply apparatus is not used for charging of the rechargeable battery.

13. The non-transitory recording medium according to claim 11, wherein the method of controlling further comprises:
in a case where power is receivable by both the contactless power receiving operation and the contact power receiving operation, requesting the power supply apparatus to reduce power supplied from the power supply apparatus.

14. The non-transitory recording medium according to claim 11, wherein the method of controlling further comprises:
in the case of bringing a state where power is receivable by both the contactless power receiving operation and the contact power receiving operation into a state where power is not receivable by the contact power receiving operation, giving a notice to the power supply apparatus that the rechargeable battery is charged with power from the power supply apparatus.

15. The non-transitory recording medium according to claim 11, wherein the method of controlling further comprises:
in the case of bringing a state where power is receivable by both the contactless power receiving operation and the contact power receiving operation into a state where power is not receivable by the contact power receiving operation, making a request to the power supply apparatus that power supplied from the power supply apparatus is increased.

* * * * *